United States Patent
Matsui et al.

(10) Patent No.: US 8,397,777 B2
(45) Date of Patent: Mar. 19, 2013

(54) RUN-FLAT TIRE

(75) Inventors: Hiroshi Matsui, Kobe (JP); Chieko Aoki, Kobe (JP); Takaaki Ishida, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 343 days.

(21) Appl. No.: 12/741,130

(22) PCT Filed: Nov. 6, 2008

(86) PCT No.: PCT/JP2008/070218
§ 371 (c)(1),
(2), (4) Date: May 3, 2010

(87) PCT Pub. No.: WO2009/063794
PCT Pub. Date: May 22, 2009

(65) Prior Publication Data
US 2010/0236683 A1    Sep. 23, 2010

(30) Foreign Application Priority Data
Nov. 14, 2007   (JP) .................................. 2007-295958

(51) Int. Cl.
*B60C 17/00*  (2006.01)
*B60C 11/03*  (2006.01)
*B60C 3/00*   (2006.01)
(52) U.S. Cl. ..................... 152/517; 152/209.2; 152/454
(58) Field of Classification Search .................. 152/516, 152/517; *B60C 17/00*
See application file for complete search history.

(56) References Cited

U.S. PATENT DOCUMENTS 4,474,223 A * 10/1984 Landers ..................... 152/209.2
5,996,660 A * 12/1999 Kakumu et al. ............ 152/209.1

FOREIGN PATENT DOCUMENTS

| GB | 2053815 A | * | 2/1981 |
| JP | 08337101 A | * | 12/1996 |
| JP | 2005-67315 A | | 3/2005 |
| JP | 2008-137617 A | | 6/2008 |

OTHER PUBLICATIONS

English Language Machine Translation of JP2005-067315, 2005.*

* cited by examiner

*Primary Examiner* — Justin Fischer
*Assistant Examiner* — Philip N Schwartz
(74) *Attorney, Agent, or Firm* — Birch, Stewart, Kolasch & Birch, LLP

(57) ABSTRACT

A run-flat tire capable of reducing weight and enhancing its uniformity. The run-flat tire 1 provides a toroidal carcass 6 extending from a tread portion 2 to the bead core of each bead portion 4 through each of sidewall portions 3 and a pair of side reinforcing rubbers 9 arranged inside the carcass 6 and extending along the sidewall portions 3 in the tire radial direction inwardly and outwardly. In the outer surface of the tread portion 2, pattern elements are arranged, thereby forming a pitch pattern. Each of the side reinforcing rubber 9 provides with recesses 11 circumferentially spaced on the inner surface of side reinforcing rubber facing the tire cavity. The total number (n) of recesses 11 on each of the side reinforcing rubber 9 is 0.70 to 1.30 times the total number of pattern elements.

5 Claims, 16 Drawing Sheets

Periodical function of pitch pattern

Periodical function of recess array

Recess array of Example 7

Recess array of Example 8

Recess array of Example 9

Recess array of Examples 10 and 17

Recess array of Example 11

Recess array of Examples 12A, 12B

Recess array of Examples 13 and 16

Recess array of Example 14

Recess array of Example 15

RUN-FLAT TIRE

FIELD OF THE INVENTION

The present invention relates to a run-flat tire capable of reducing weight and enhancing its uniformity.

BACKGROUND OF THE ART

It is known that a vehicle using run-flat tires can run ongoingly a certain distance at a comparatively high speed even if the tire goes flat because of puncture (referred to as "run-flat running"). Such a run-flat tire is provided with side reinforcing rubber having a substantial crescent cross-sectional shape to enhance bending rigidity of each sidewall portion. When the tire goes flat, the side reinforcing rubber suppresses vertical deflection of tire, hereby maintaining ongoing running.

However, the run-flat tire is more likely to increase in tire mass, so that it can lead to problems of deteriorations of fuel efficiency and ride comfort during normal running with tires at standard inflation pressure.

To solve the problems, the applicant of the present invention proposes a run-flat tire provided with recesses, which extended in the tire radial direction inwardly and outwardly and spaced in the tire circumferential direction, on an inner surface of a side reinforcing rubber (see the following Patent Document 1). The proposed run-flat tire could save the tire weight by reducing the volume of a side reinforcing rubber.

Patent Document 1: Japanese Patent Application Laid-Open No. 2005-67315.

DISCLOSURE OF INVENTION

Problem to be Solved by the Invention

Studying further a run-flat tire provide with recesses in an inner surface of side reinforcing rubber, inventors detected the possibility of improving uniformity while achieving weight reduction by limiting the total number (n) of recesses in the side reinforcing rubber in a correlation with the total number of pattern elements disposed in an outer surface of tread portion.

The main purpose of the present invention is therefore to provide a run-flat tire providing performances of improving weight reduction and uniformity without deteriorating run-flat durability.

Means of Solving the Problems

The present invention is characterized in that
a run-flat tire comprising a toroidal carcass extending from a tread portion to a bead core of each bead portion through each of sidewall portions, and a pair of side reinforcing rubbers arranged inside the above-mentioned carcass and extending in the tire radial direction inwardly and outwardly along the sidewall portions; wherein
on the outer surface of the above-mentioned tread portion, a pitch pattern is made of pattern elements, which is the minimum unit of repeat pattern, aligned in the circumferential direction of the tire;
each of the above-mentioned side reinforcing rubbers is provided with recesses circumferentially spaced on the inner surface of the side reinforcing rubber facing the tire cavity; and
the total number (n) of recesses on each of the side reinforcing rubbers is 0.70 to 1.30 times the total number of pattern elements.

Effects of the Invention

The run-flat tire of the present invention is provided on with recesses circumferentially spaced on an inner surface of a side reinforcing rubber. These recesses cause a volume reduction of the side reinforcing rubber and a weight reduction of the side reinforcing rubber as compared with a conventional tire. The total number of the recesses on the side reinforcing rubber is set to be 0.70 to 1.30 times the total number of pattern elements. This allows to prevent from enormous decrease of rigidity of the side reinforcing rubber and to improve uniformity of the tire.

| Explanation of the Reference | |
|---|---|
| 1 | Run-flat tire |
| 2 | Tread portion |
| 3 | Sidewall portion |
| 4 | Bead portion |
| 5 | Bead core |
| 6 | Carcass |
| 7 | Belt layer |
| 9 | Side reinforcing rubber |
| 9B | Base body of side reinforcing rubber |
| 9Bi | Inner surface of side reinforcing rubber |
| 11 | Recess |

BEST EMBODIMENT TO OPERATE THE INVENTION

An embodiment of the present invention will be explained based on drawings.

Figure 1:
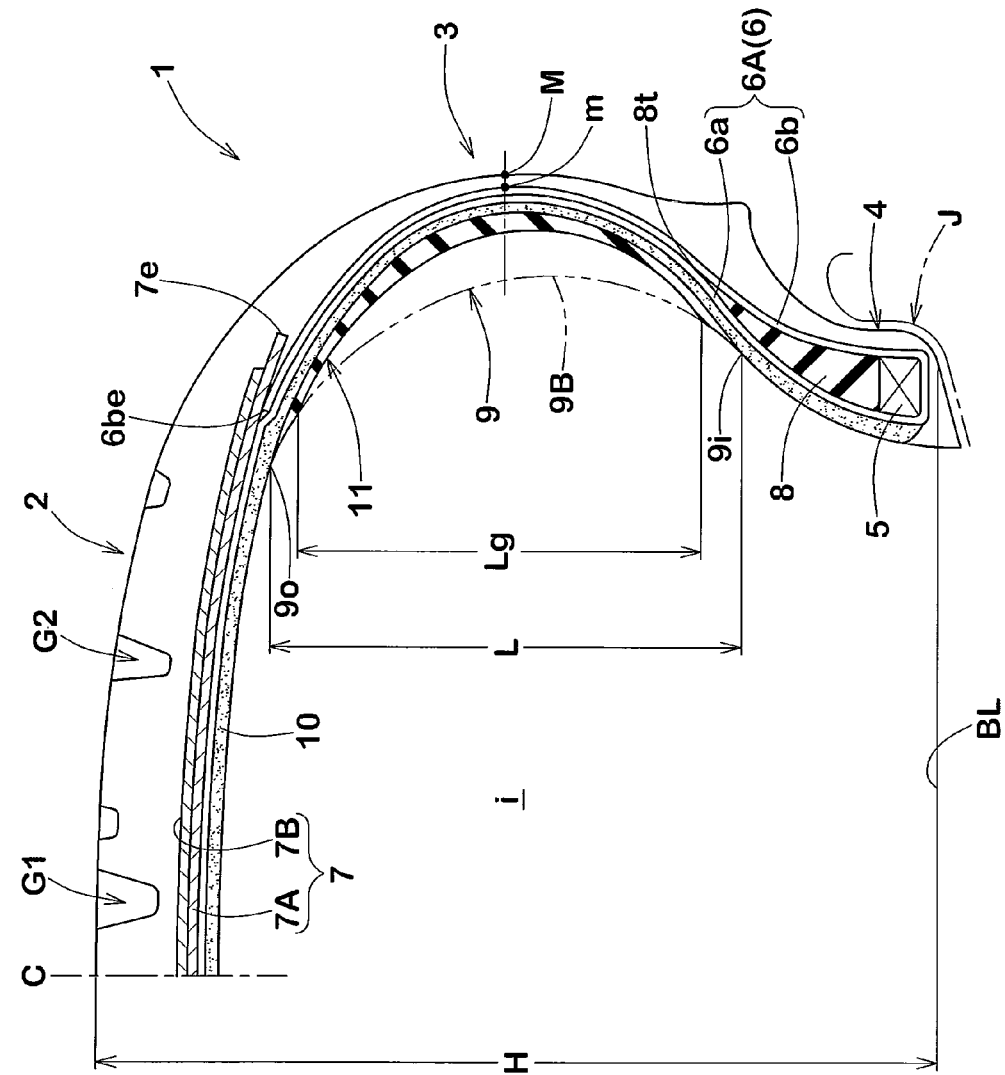
FIG. 1 A cross-sectional view of a run-flat tire showing an embodiment of the present invention.
Figure 2:
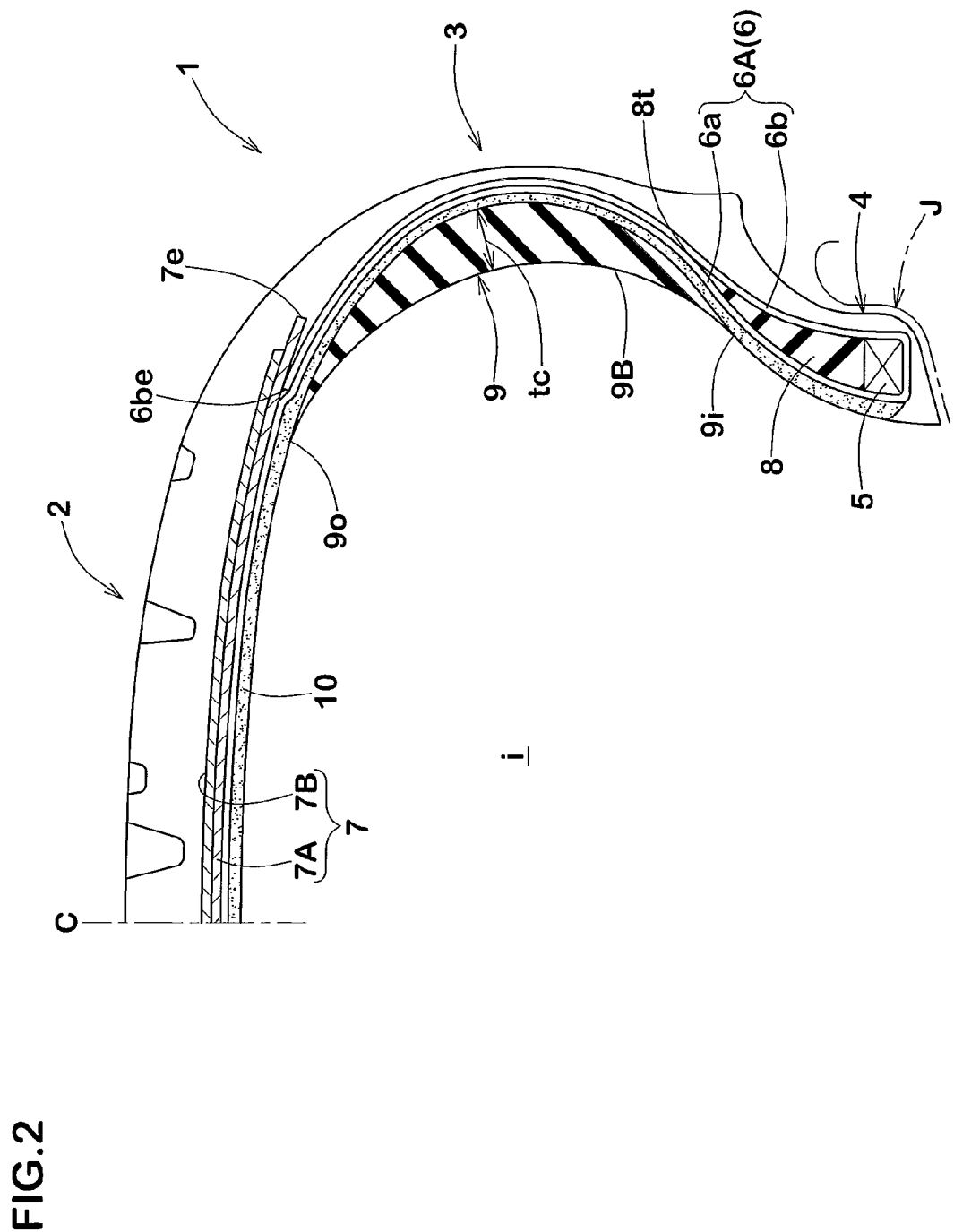
FIG. 2 A cross-sectional view of the run-flat tire of FIG. 1 at another point in the tire circumferential direction.
Figure 3:
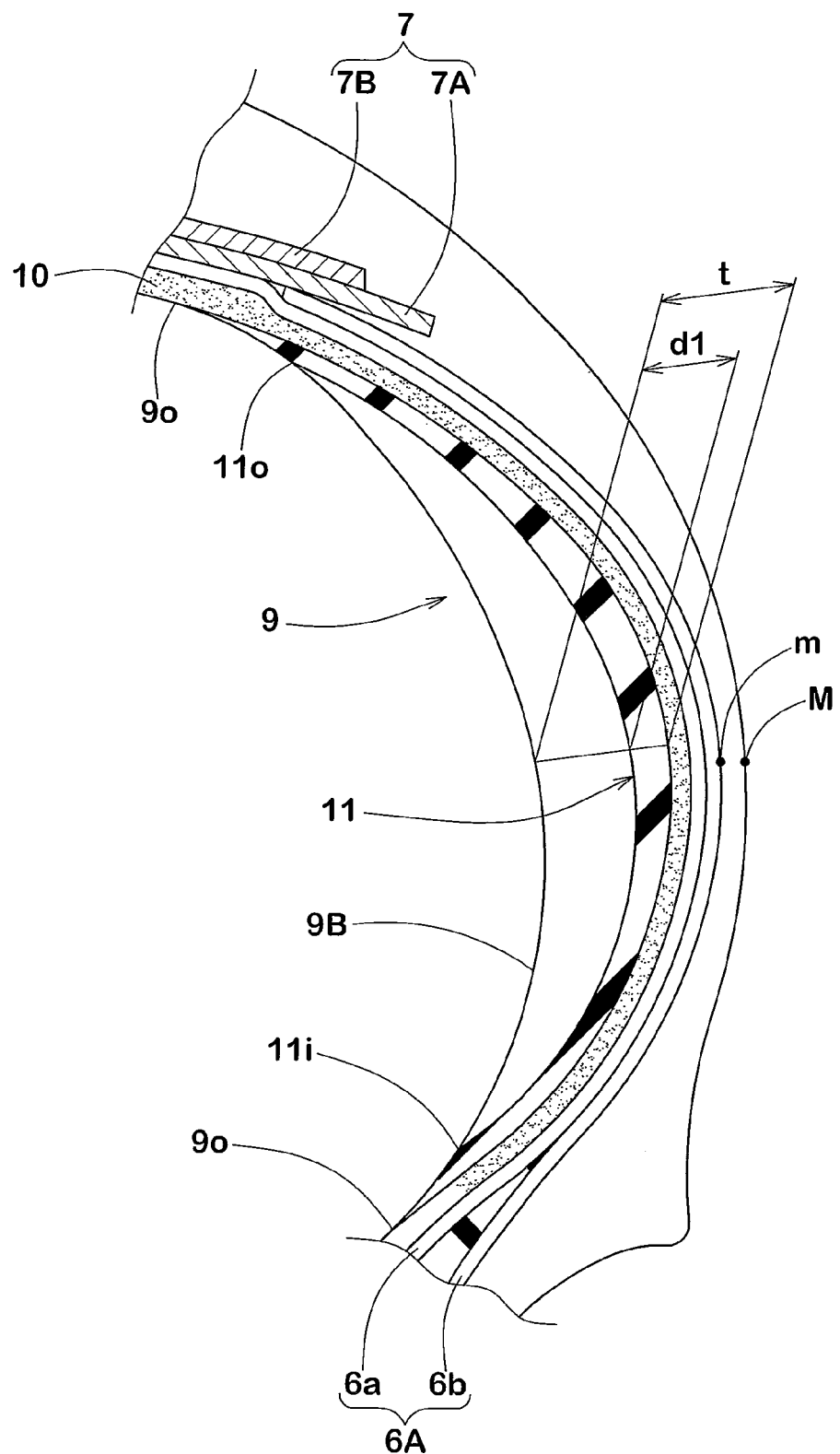
FIG. 3 A partially enlarged illustration of its sidewall portion.
Figure 4:
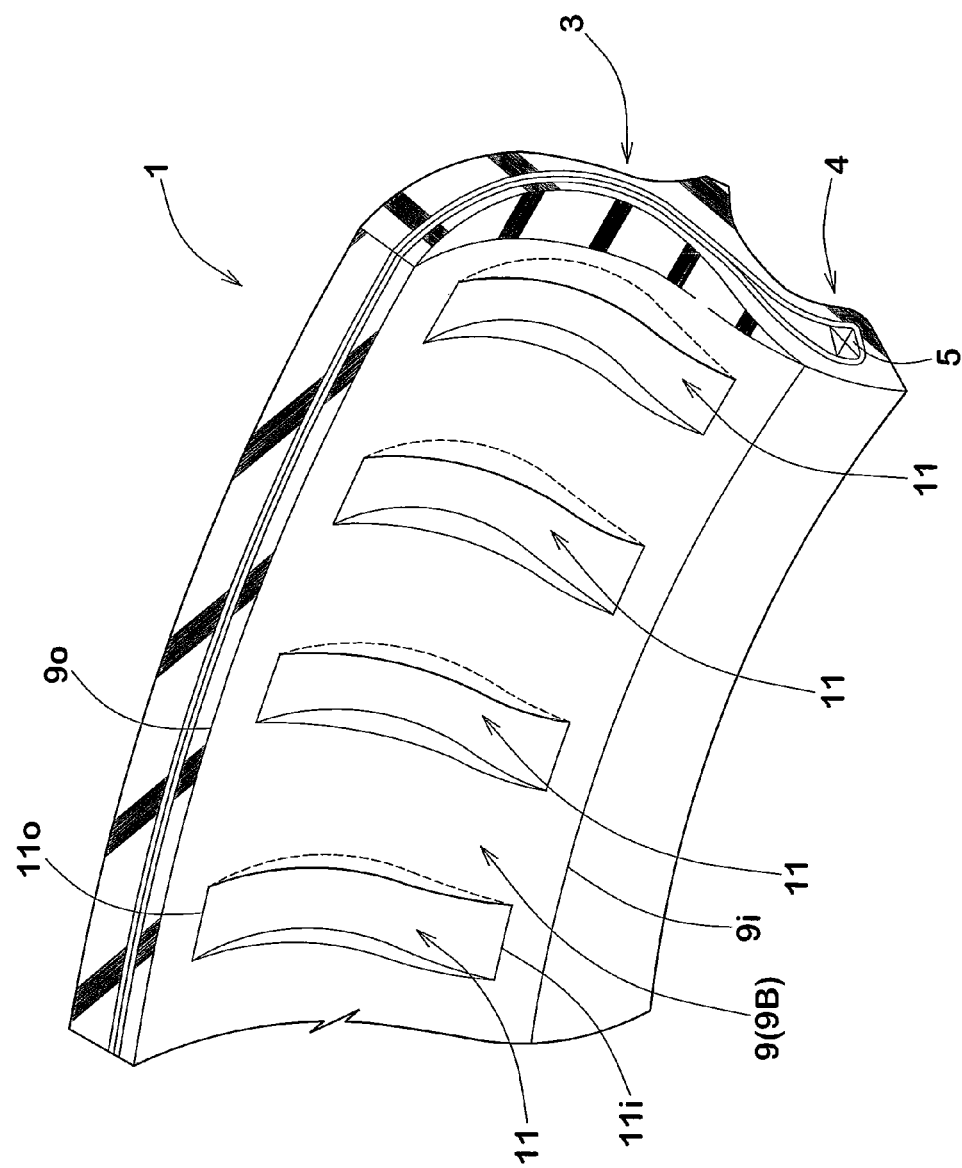
FIG. 4 A partially perspective view of the sidewall portion as though looking from a tire cavity.

FIG. 1 shows a cross-sectional view of a run-flat tire 1 of the present embodiment under standard unloaded state. FIG. 2 shows a cross-sectional view of the run-flat tire of FIG. 1 at another point in the tire circumferential direction. FIG. 3 shows a partially enlarged illustration of FIG. 1. FIG. 4 shows a partially perspective view of the above-mentioned tire 1 as though looking from a tire cavity side. The measurements of each part are measured under the above-mentioned standard unloaded state, except as otherwise noted.

Here, the "standard unloaded state" is a state when the run-flat tire 1 is mounted on a standard wheel rim J, inflated to a standard inner pressure, and unloaded.

Here, the "standard rim" is a design rim which may be a rim officially approved for the tire by a standard organization, namely, "Standard rim" in JATMA, "Design Rim" in TRA, "Measuring Rim" in ETRTO and the like.

The "standard inner pressure" is the "maximum air pressure" in JATMA, the maximum pressure given in the "Tire Load Limits at Various Cold Inflation Pressures" table in TRA the "INFLATION PRESSURE" in ETRTO, or the like. In case of tires for passenger vehicles, however, 180 kPa is used as the standard inner pressure.

The above-mentioned run-flat tire 1 comprises a carcass 6 extending from a tread portion 2 to a bead core 5 of each bead portion 4 through each of sidewall portions 3; a belt layer 7 disposed outside the carcass 6 in the radial direction of the tire and inside the tread portion 2; a bead apex 8 extending outwardly in the radial direction of the tire in a tapered manner from the outer surface of the above-mentioned bead core 5; an inner liner rubber 10 made of rubber having gas barrier properties and arranged inside the carcass 6; and a side reinforcing rubber 9 disposed inside the inner liner rubber 10 and at least partially inside the sidewall portion 3.

Figure 5:
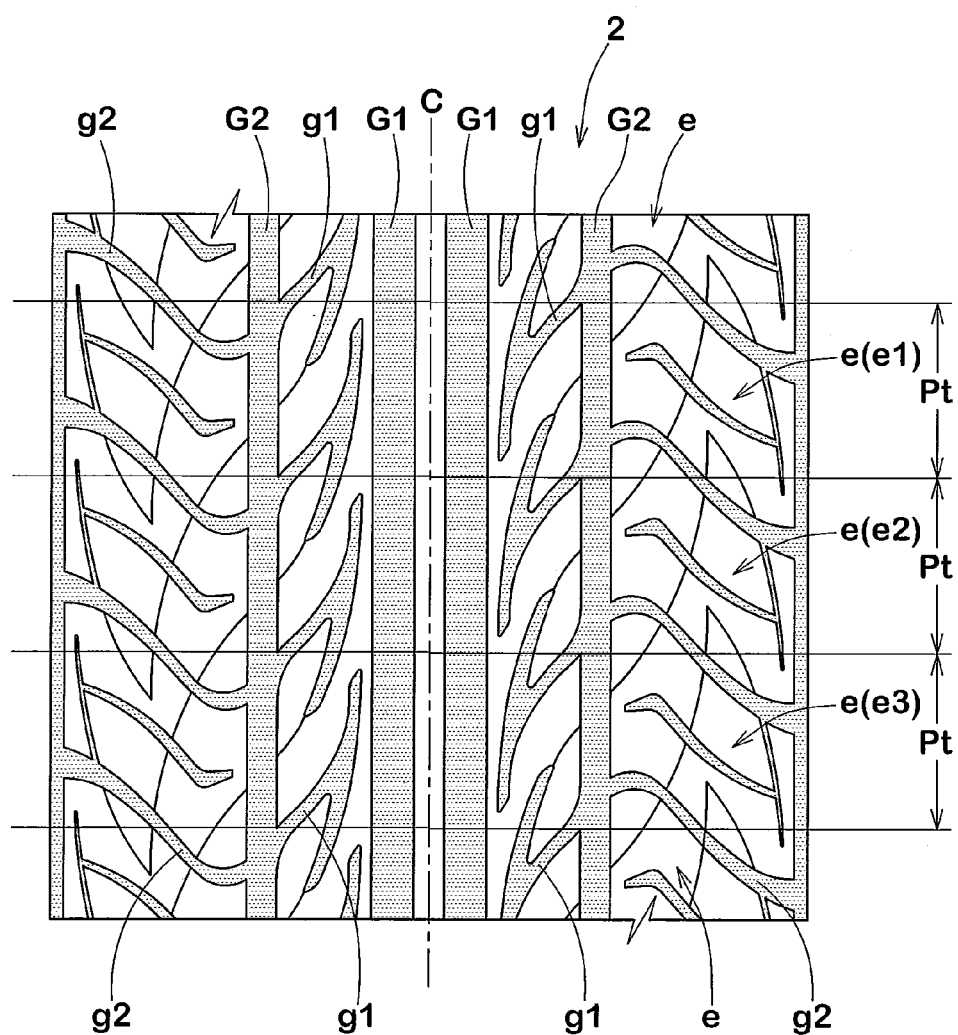
FIG. 5 A development view of an outer surface of a tread portion.

FIG. 5 shows a development view of an outer surface of the tread portion 2. In the outer surface of the tread portion 2, there are longitudinal main grooves G1 and G2 extending continuously in the circumferential direction of the tire and a number of lateral grooves g1 and g2 intersecting with these longitudinal main grooves, and thereby forming a pattern (tread pattern). The tread pattern is formed as a pitch pattern in which pattern elements (e) are arranged circumferentially by forming the lateral grooves g1 and g2 nearly periodically in the circumferential direction of the tire.

Here, the pattern element (e) is the smallest unit to form the repetitive pattern of the outer surface of the tread portion. Moreover, the pattern element (e) has a pitch Pt of a circumferential length of tire. The pitch Pt may be constant, but it is preferable to include not less than two kinds of pitches, more preferably not less than three kinds of pitches, much more preferably not less than five kinds of pitches having different lengths. It is desirable to adopt a pitch variation, wherein pitch noise changes into so-called white noise, by decentrally-arranging the pattern elements e1, e2, e3 . . . having different pitches Pt in the circumferential direction of the tire, for example.

Figure 6A:
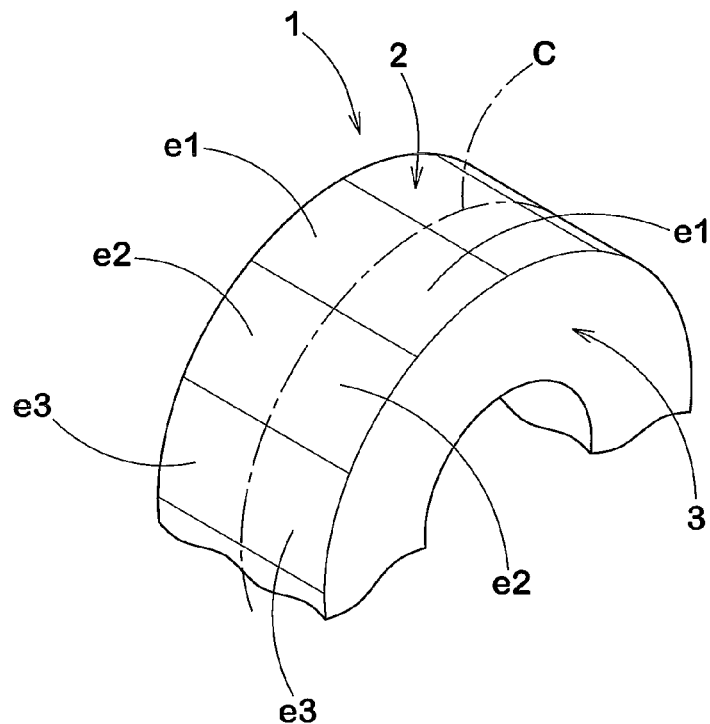
FIGS. 6 (*a*) and (*b*) are pattern diagrams explaining examples of pitch patterns of the tread portion.

The pattern elements (e) of the present embodiment are intersected by tire-axial-direction lines passing through an axial end of the lateral groove g1, and one pattern element (e) is defined as being between one tread end and the other tread end. That is to say, as shown schematically in FIG. 6(a), the pitch pattern of the present embodiment is made in a symmetrical pitch array in both sides of the tire equator C in which the pattern elements e1, e2, e3 . . . each having the same pitch are arranged so as to match the circumferential phases.

The carcass 6 is made of at least one carcass ply, one carcass ply 6A in the present embodiment, having carcass cords arranged at an angle of 70 to 90 degrees with respect to the tire equator C. For the above-mentioned carcass cords, organic fibers such as nylon, polyester, rayon, and aromatic polyamide, are preferably used. And, the carcass ply 6A comprises a main portion 6a being toroidal and extending from one bead core 5 to the other bead core 5, and a pair of turnup portions 6b provided on both sides thereof and turned-up from the inside to the outside in the axial direction of the tire around the bead cores 5.

Between the main portion of carcass ply 6a and turnup portion of carcass ply 6b of the above-mentioned carcass ply 6A, there is the above-mentioned bead apex rubber 8. The bead apex rubber 8 is made of comparatively hard rubber having rubber hardness of not less than 65 to 95 degrees, more preferably 70 to 90 degrees, thereby heightening bending rigidity of the bead portion 4 and improving steering stability.

In the present embodiment, the turnup portion 6b of carcass ply 6A extends in the radial direction of the tire across outwardly an outer end 8t of the bead apex 8, and its outer end portion 6be is between the main portion 6a and the belt layer 7. These will allow to reinforce the sidewall portion 3 by a single carcass ply 6A effectively.

The above-mentioned belt layer 7 is composed of two belt plies 7A and 7B having belt cords (steel cords, in the present embodiment) arranged at an angle of 10 to 35 degrees, for example, with respect to the tire equator C.

The above-mentioned inner liner rubber 10 is toroidal and extends nearly from one bead portion 4 to the other bead portion 4 along the inner side of the carcass 6 in order to keep air in the tire cavity (i). The inner liner rubber 10 is made of rubber composition having gas-barrier property such as butyl rubber, halogenated butyl rubber and/or brominated butyl rubber.

As shown in FIG. 2, the side reinforcing rubber 9 of the present embodiment is arranged inside the inner liner rubber 10 and includes a base portion 9B tapered from its center portion toward the radially inner end 9i and radially outer end 9o respectively and extending in smoothly curved manner along the sidewall portion 3. The side reinforcing rubber 9 is continuously annular in the circumferential direction of the tire.

As shown in FIG. 1, the radially inner end 9i of the side reinforcing rubber 9 is preferably arranged radially inside the outer end 8t of the bead apex 8 and radially outside the outer surface of the bead core 5. This will allow bending rigidity of the sidewall portion 3 and the bead portion 4 to improve in a well balance. Meanwhile, the outer end 9o of the side reinforcing rubber 9 extends to the inside of the tread portion 2, for example, and arranged inside the outer end 7e of the belt layer 7 in the axial direction of the tire in the present embodiment. This will allow the rigidity of a buttress portion and the like to heighten effectively.

The radial length L between the inner end 9i and the outer end 9o of the side reinforcing rubber 9 (that is to say, a length of the side reinforcing rubber 9 in the radial direction of the tire) is not limited specifically. However, the effect of reinforcing the sidewall portion 3 cannot be sufficiently obtained when the length is too small, but the ride comfort during normal running and the mounting performance on a rim are apt to deteriorate when it is too large. From this point of view, the length L is preferably 35 to 70% of a tire cross-section height H, more preferably 40 to 65%. The tire cross-section height H is a distance from a bead base line BL to an outermost position in the radial direction of the tire.

A thickness of the side reinforcing rubber 9 can be defined in accordance with a load on the tire or with a tire size. The effect of reinforcing the sidewall portion 3 cannot be sufficiently obtained when its maximum thickness (tc) (shown in FIG. 2) is too small. The maximum thickness (tc) is, therefore, preferably not less than 5 mm, more preferably not less than 8 mm. Meanwhile, when the maximum thickness (tc) is too large, since it is liable to cause the increase tire weight and the occurrence excessive fever, the thickness (tc) is preferable not more than 20 mm, more preferably not more than 15 mm.

The hardness of the side reinforcing rubber 9 is preferably not less than 65 degrees, more preferably not less than 70 degrees, much more preferably not less than 74 degrees to inhibit vertical deflection of the tire during run-flat running. Meanwhile, when the hardness of the side reinforcing rubber 9 is too large, the vertical spring becomes enormously large, and the ride comfort during normal running may remarkably deteriorate. So, the hardness of the side reinforcing rubber 9 is preferably not more than 99 degrees, more preferably not more than 90 degrees.

The rubber hardness of this specification is a hardness measured in durometer type A in accordance with JIS-K6253.

As shown in FIGS. 3 and 4, each of the side reinforcing rubbers 9 provides with plural recesses 11 on the inner surface of the base portion 9B, wherein the recesses 11 are made by putting a dent in the inner surface facing the tire cavity and are spaced in the circumferential direction of the tire. In such a run-flat tire 1, the recesses 11 help to reduce the volume of the side reinforcing rubber 9, thereby providing side reinforcing rubber 9 lighter than conventional ones. This may allow the fuel efficiency and ride comfort during normal running to improve. And, the conspicuous decline of rigidity of the side reinforcing rubber 9 can be prevented since the recesses 11 are provided with spacing without continuing in the circumferential direction. Therefore, deterioration of run-flat performance can be pretended.

Figure 7:
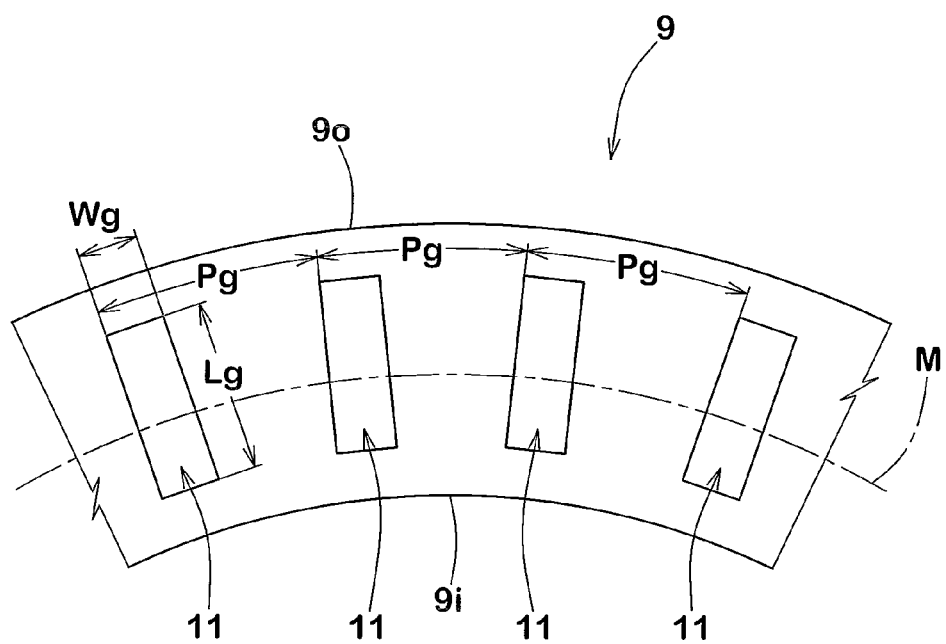
FIG. 7 A side view showing a side reinforcing rubber of the present embodiment.

As shown in FIGS. 4 and 7, the recesses 11 of the present embodiment are like grooves extending substantially in parallel with the tire radial direction and have the same shape, that is to say, each having the same shape of the opening, depth, and inner volume. The recess 11 extends across a maximum width position M of the tire, and spaced in a constant circumferential pitch Pg at the same position of the radial direction of the tire. The tire maximum width position M is defined from a profile shape in cross section of the tire expect letters, read patterns, and a rim protect provided in the sidewall portion 3. To be more precise, the tire maximum width position is at a point (m) that is substantially same height of the maximum width of the carcass 6.

The recess 11 is not limited as rectangular as the present embodiment, but it may be formed in a variety shapes, for example a circle, oval, triangle, and lozenge. However, the recess 11 is preferably a rectangle that has its radial length L is larger than its circumferential length Wg. This deforms the recess 11 so as to enlarge its opening width when the tread portion 2 contacting a road surface, and then preferable impact relaxation performance effectively exerts.

The recess 11 is not limited extending in parallel to the radial direction of the tire, but it may extend with an inclination with respect to the radial direction of the tire. In this case, it is preferable that an angle of the recess 11 with respect to the radial direction of the tire is set to not more than 30 degrees, more preferable not more than 15 degrees, much more preferable not more than 5 degrees.

The inventor of the present invention performed a large variety of experiments upon the total number N of the above-mentioned pattern elements (e) of the tread portion 2 and upon the total number (n) of recesses 11 of each side reinforcing rubber 9. They found that it can keep the tire uniformity and vibration property well by limiting the ratio (n/N) in a certain range. Namely, in the run-flat tire 1 of the present invention, it is one of the subject matters that the total number (n) of recesses 11 provided in each side reinforcing rubber 9 is set to 0.70 to 1.30 times the total number N of the pattern elements (e).

The tire has vibration characteristics depending on the total number N of pattern elements (e) of the tread portion 2. However, when providing the side reinforcing rubber 9 with recesses 11, which total number (n) is related in the certain range to the total number N of pattern elements, the circumferential rigidity distribution achieved by the pattern elements (e) and the circumferential rigidity distribution of the side reinforcing rubber 9 achieved by the recesses 11 balance each other so as to make the rigidity distribution of the whole tire uniform. It greatly improves the uniformity and vibration characteristics of the tire.

Besides, the total number (n) of recesses 11 arranged in the respective side reinforcing rubbers 9 is preferably not less than 0.80 times the total number N of pattern elements (e), more preferable not less than 0.85 times. As for the upper limits, it is preferably not more than 1.20 times, more preferable not more than 1.15 times.

In the present embodiment, the recesses 11 are provided in the side reinforcing rubber 9 with having constant circumferential pitch Pg. Moreover, in the present embodiment, each recess 11 arranged in the right-and-left side reinforcing rubber layers 9 is disposed at a symmetrical position about the tire equator C. That is to say, in the right-and-left side reinforcing rubber layers 9, each of the recesses 11 is arranged with being coherent as the pitch pattern of the tread portion 2 in the present embodiment.

A pitch of the pattern elements (e) of the outer surface of the tread portion 2 is variable as described above. With regard to the variable pitch, the rate of change of pitch of two pattern elements of which pitch lengths are closest to each other (calculated by the undermentioned formula) is preferably not more than 70%, more preferably not more than 50%, much more preferably not more than 25%. When the above-mentioned rate of charge of pitch is too large, the circumferential rigidity distribution of the tread portion 2 changes largely, so that cannot absorb it by providing only the side reinforcing rubbers 9 with the recesses 11.

$$\text{Rate of change of pitch (\%)} = 100 \times (Pt1 - Pt2)/Pt2$$

Here, "Pt1" is a pitch length of a major patter element, and "Pt2" is a pitch length of a minor pattern element.

Figure 8A:
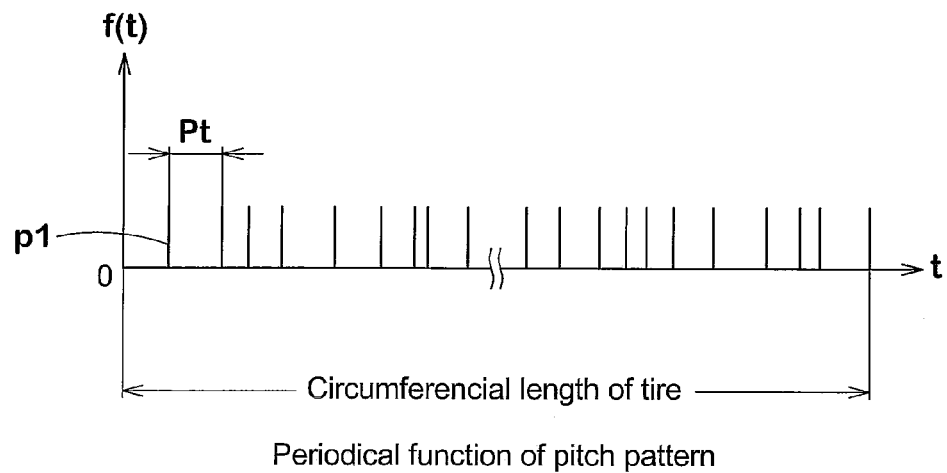
FIGS. 8 (*a*) and (*b*) are graphs showing periodical functions of pitch patterns and recess arrays.
Figure 8B:
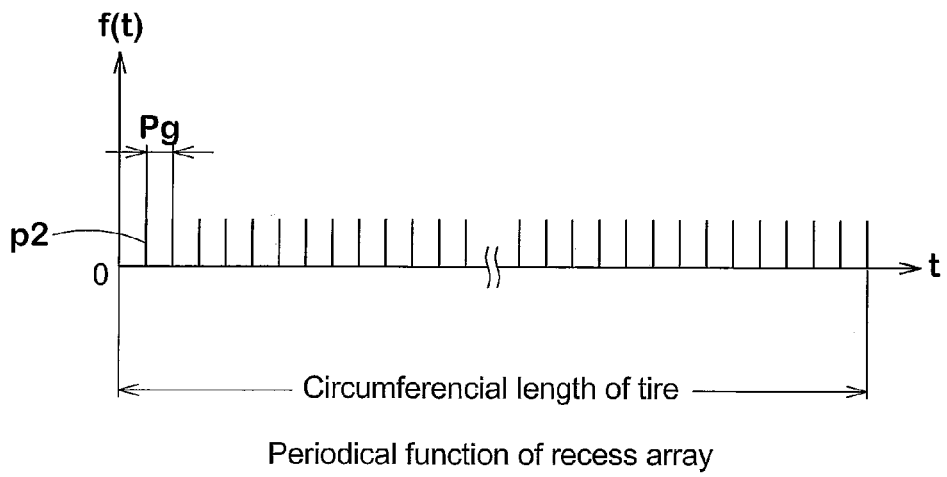
Figure 9:
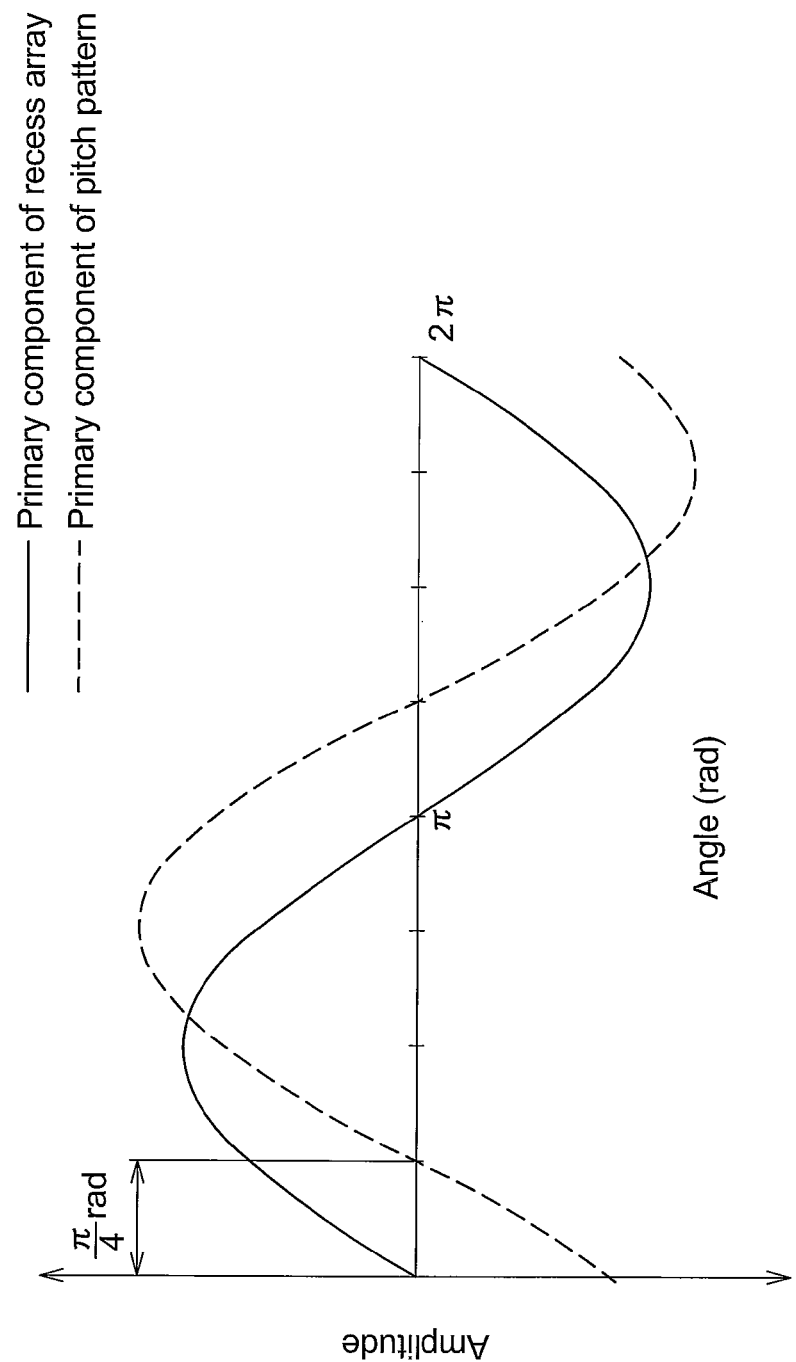
FIG. 9 graph showing primary component of the pitch pattern and each recess array.

FIG. 8 (a) shows a periodical function obtained by substituting a unit pulse p1 for each of the pattern elements of the above-mentioned pitch pattern. The pulse row of this periodical function is formed in an array sequence of the pattern elements with reference to an arbitrary pattern element (e). In the pulse row, the pulses are spaced each other in the circumferential direction by a pitch Pt of the pattern elements (e).

similarly, FIG. 8 (b) shows a periodical function obtained by substituting a unit pulse p2 for each of the recesses 11 of the array of recess 11. The pulse row of this periodical function is formed in an array sequence of the array of the recess with reference to one of recesses 11 of the corresponding positions to the above-mentioned reference point of the pattern element (e) (that is to say, the closest point from the reference point). Furthermore, in the pulse row, the pulses are spaced each other in the circumferential direction of the tire by a circumferential length Pg of the recess 11. Moreover, FIG. 9 shows primary components (fundamental wave components) of pitch pattern and recess array obtained by expanding the above-mentioned respective periodic functions into Fourier series (FFT), and each is shown as one period.

The run-flat tire 1 of the present embodiment, the phase difference δ between a primary component of the above-mentioned pitch pattern and a primary component of the above-mentioned recess array is set to not more than π/2 (rad). A peak of the primary component of the pitch pattern relates to a major rigid part in the pitch pattern of the tread portion 2. Meanwhile, a peak of the primary component of the recess array relates to a minor rigid part of the side reinforcing rubber 9. Therefore, when the phase difference δ of each of the above-mentioned primary components is preferably set to not more than π/2 (rad), more preferably not more than π/4 (rad). Much more preferably when the phases are substantially conformed to each other, the tire rigidity will be more uniformized in the circumferential direction of the tire by balancing strong and weak of the rigidities so as that the uniformity can be improved more.

Here, a length Wg in the circumferential direction of the tire, a length Lg in the radial direction of the tire, and a depth d1 of the recess 11 and the like may be determined accordingly based on a tire size and the like. However, when the length Wg, length Lg, or depth d1 is too small, effects of weight reduction and ride comfort are not improved sufficiently. When the length Wg, length Lg, or depth d1 is too large, load support performance during run-flat running cannot be improved sufficiently, and it may be liable to decrease the run-flat durability.

Based on this perspective, the circumferential length Wg of the recess 11 is preferably not less than 5 mm, and more preferably not less than 8 mm; and as to its upper limit, it is preferably not more than 15 mm, and more preferably not more than 13 mm. In the same way, the radial length Lg of the recess 11 is preferably not less than 20%, more preferably not less than 30% of the above-mentioned length L of the side reinforcing rubber 9; and regarding its upper limit, it is preferably not more than 95%, more preferably not more than 90%, much more preferably not more than 80%.

Moreover, as shown in FIG. 3, the depth d1 of the recess 11 is preferably not less than 20%, more preferably not less than 30%, and much more preferably not less than 40% of the thickness (t) of the side reinforcing rubber; and as for its upper limit, it is preferably not more than 80%, more preferably not more than 70%, much more preferably not more than 60%. Meanwhile, in the recess 11 of the present embodiment, the depth d1 is tapered from a center portion in the longitudinal direction toward an inner end 11i and an outer end 11o of the radial direction of the tire.

A volume of the recess 11 is preferably mot less than 0.5 cm$^3$, more preferably not less than 0.8 cm$^3$. Regarding its upper, it is preferably not more than 3.0 cm$^3$, more preferably not more than 2.5 cm$^3$ The recesses 11 are arranged and spaced by a certain pitch in the tire circumferential direction in the aforementioned embodiment, but it can be variable. For example, the recesses 11 periodically arranged may cause a specified-frequency vibration and noise such as resonance of a character frequency of the tire to occur. Therefore, it is preferable to use different kinds, more preferably three kinds, of circumferential pitches and to arrange the recesses 11 in the tire circumferential direction so as to disarrange the periodicity of the recesses 11, thereby changing the pitch noise into white-noise.

As for the arrange way of the recesses 11, for example, it may be a good to arrange different kinds of pitches in a random manner basing of a random number sequence or a pseudorandom number sequence generated by a computer or a randomizer. It may be also arrange the pitches of the recesses 11 in a random pattern basing on a numerical sequence obtained in accordance with a chaotic function expressing an irregularity as a function or the like (for example, described in Japanese Patent Application Laid-open No. 2001-130226).

The run-flat tire 1 described above is easily manufactured by applying cutting-work of the recesses 11 to the inner surface of the base portion 9B of the side reinforcing rubber 9 after conventionally vulcanizing the tire, for example. However, for productivity improvement, it is especially desirable to form the above-mentioned recesses 11 simultaneously with the tire vulcanization.

Figure 10:
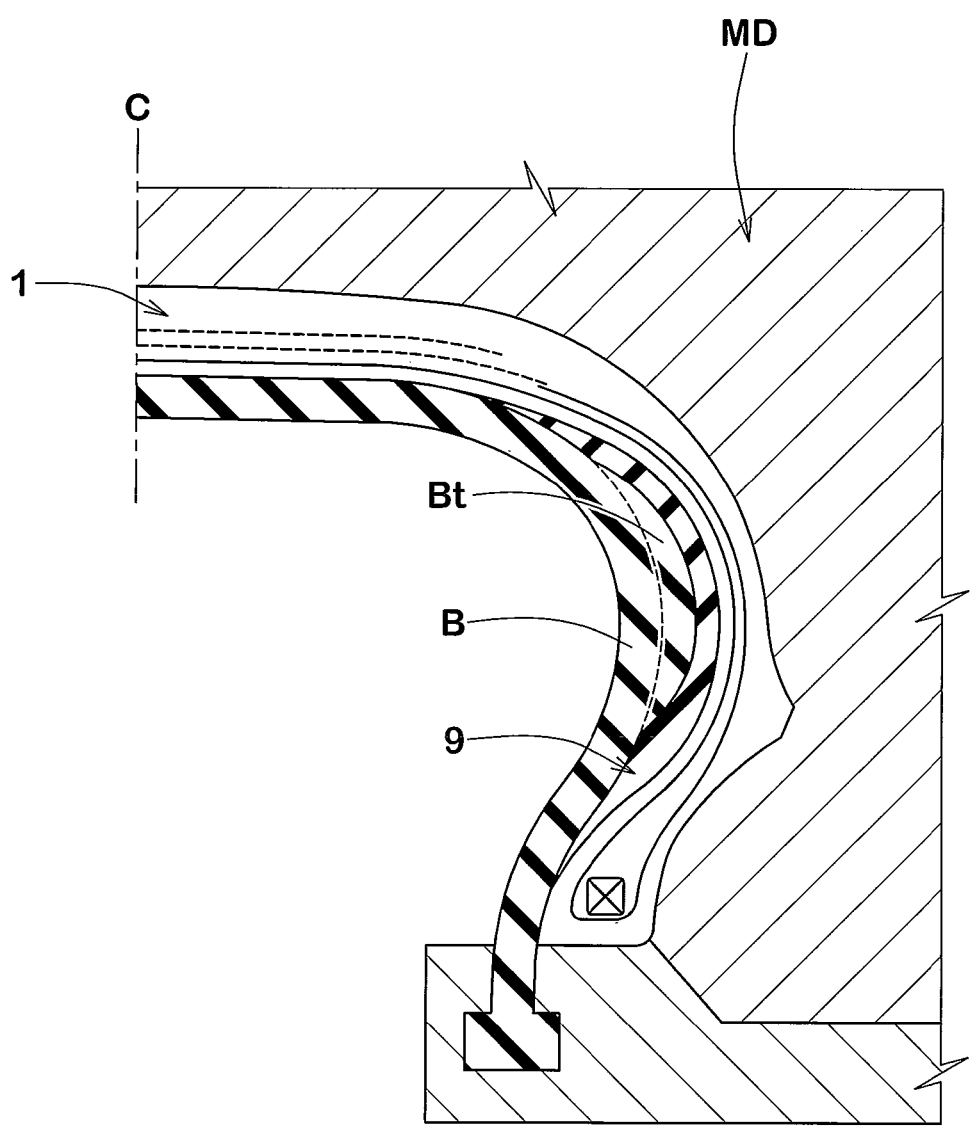
FIG. 10 A cross-sectional view showing an example of manufacturing method of a tire of the present embodiment.
Figure 11:
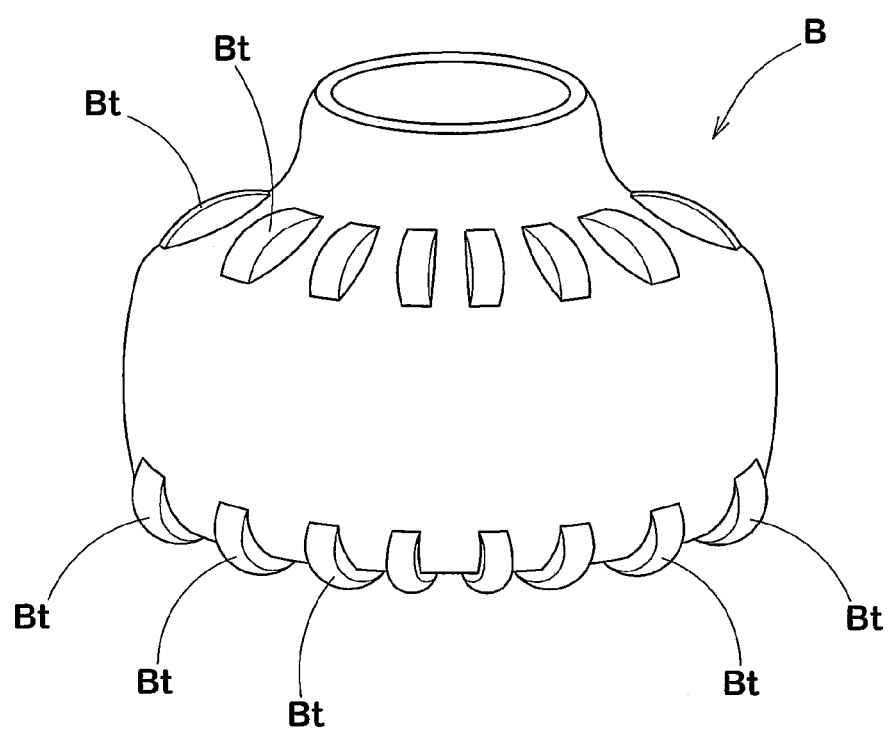
FIG. 11 A perspective view showing an example of a bladder.

As shown in FIGS. 10 and 11, for example, a balloon like bladder B disposed inside a mold MD and shaping an inner surface of the tire is previously provided with convexities Bt at positions where the bladder contacts with the side reinforcing rubber 9 to shape the recesses 11, thereby concaving the inner surface of the side reinforcing rubber 9 and vulcanizing the above-mentioned recesses 11. At that time, it is possible to set the above-mentioned phase difference δ by adjusting a relative position between a pattern on the side of the mold MD and the bladder. Needless to say, the run-flat tire 1 of the present embodiment may be manufactured in a variety method other than mentioned above.

Figure 12:
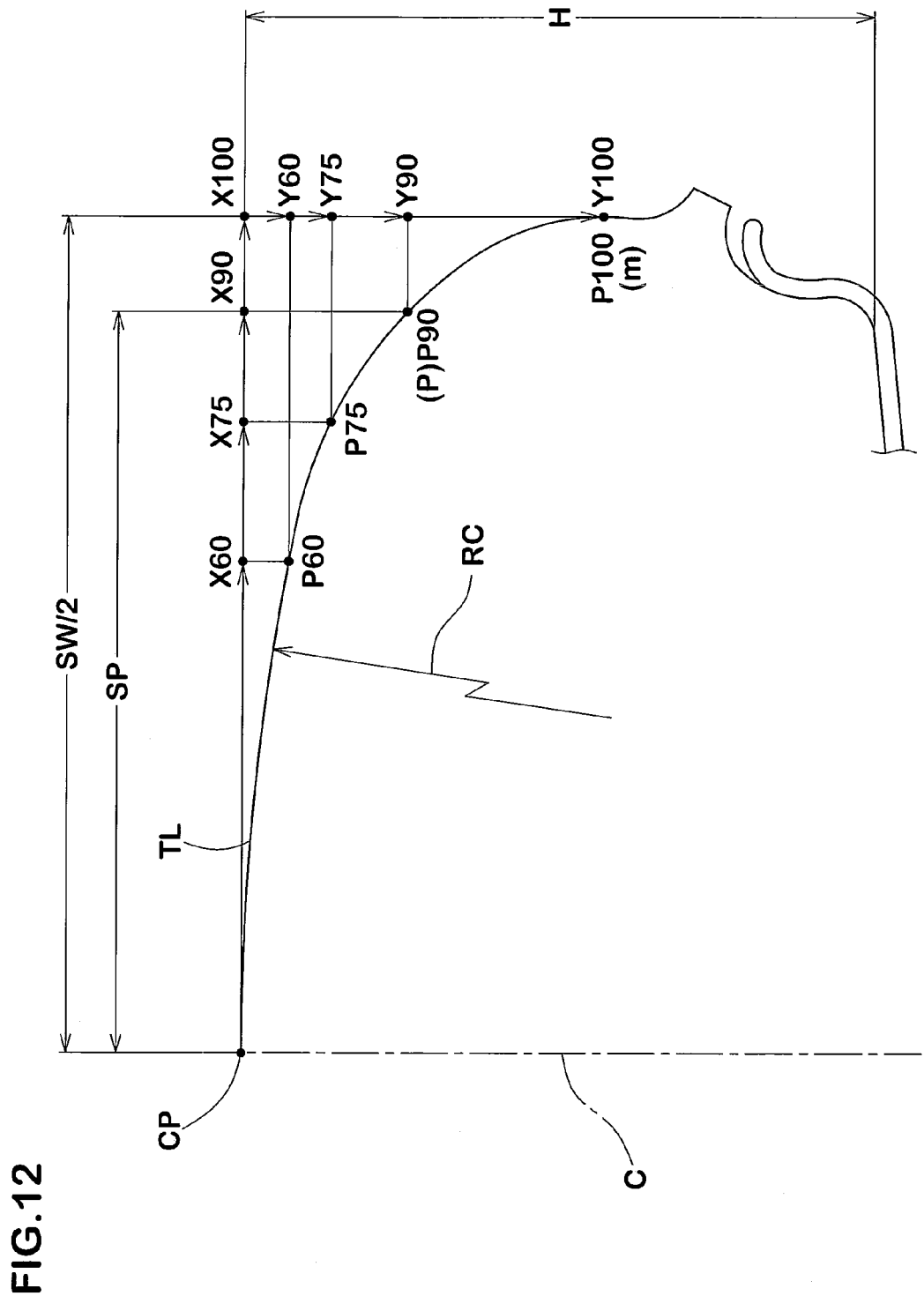
FIG. 12 A diagrammatic view showing a profile of a tire outer surface.

And the run-flat tire 1 of the present embodiment has a profile (outline) TL of the tire outer surface as shown in FIG. 12 (standard unloaded state). The profile TL is identified at the state where grooves of the tread portion 2 are bridged. In the profile TL under the aforementioned standard unloaded state, when a point P is identified as the point on an outer surface of the tire separated by a distance of 45% of the tire maximum width SW from an intersection point CP of the tire outer surface with the tire equator C, the curvature radius RC of the tire outer surface reduces gradually outwardly toward the axial direction in an interval between the above-mentioned intersection point CP and the above-mentioned point P. Also, the relationships are formulated as follows:

$$0.05 < Y60/H \leq 0.1$$

$$0.1 < Y75/H \leq 0.2$$

$$0.2 < Y90/H \leq 0.4$$

$$0.4 < Y100/H \leq 0.7.$$

Here, each of Y60, Y75, Y90, and Y100 is the distance between the above-mentioned intersection point CP and each of points P60, P75, P90, and P100 on the tire outer surface separated in the tire axial direction by a distance of 60%, 75%, 90%, and 100% of half the tire maximum axial width (SW/2) from the tire equator C. The above-mentioned "H" is a cross-sectional height of the tire.

Figure 13:
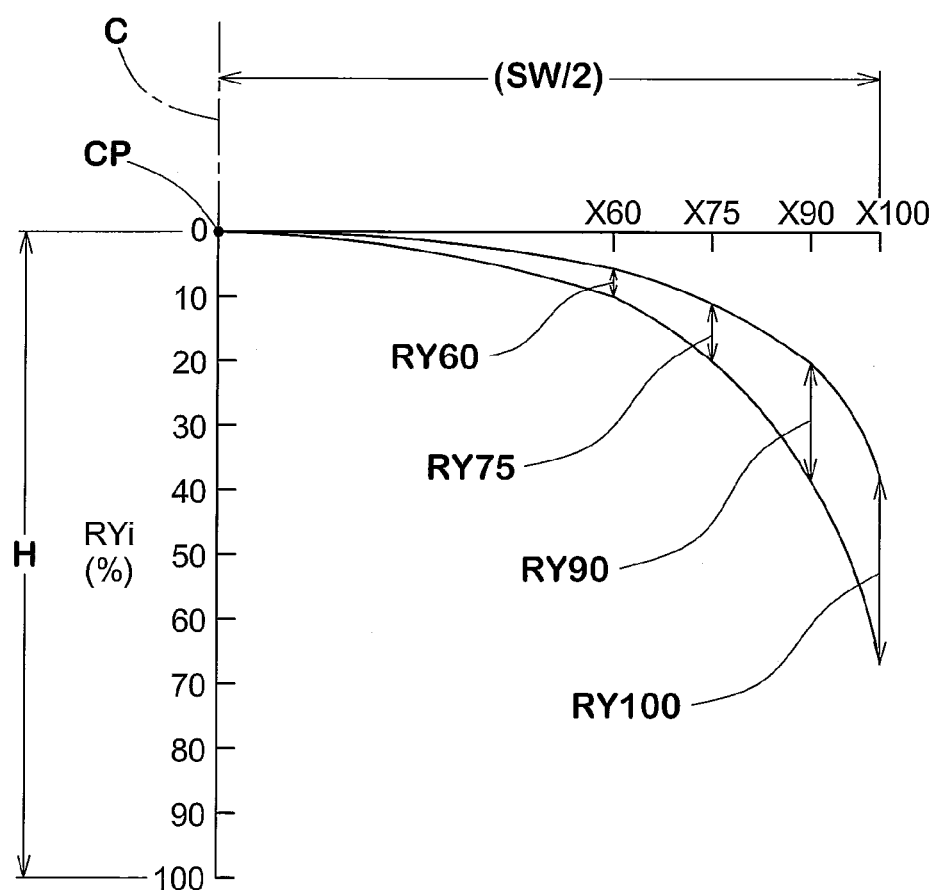
FIG. 13 A diagrammatic view showing a range of RYi at each point in the tire outer surface.

And when relations are formulated as follows:

$$RY60 = Y60/H$$

$$RY75 = Y75/H$$

$$RY90 = Y90/H$$

$$RY100 = Y100/H,$$

a range satisfying the above relations is shown as a graph in FIG. 13. As is obvious from those, the profile TL of the tire outer surface satisfying the above relations is enormously rounded off. And therefore, a ground-contacting shape of the tire having the profile TL has a ground-contacting width being small and a ground-contacting length being large. This helps to reduce the tire noise during running and to improve hydroplaning performance.

The profile TL increases an easily bending area in the tread portion 2, while it decreases an area of the sidewall portion 3. Therefore, the run-flat tire 1 providing with the profile can be considerably reduced in weight by synergistic interaction with the aforementioned weight reduction of the side reinforcing rubber 9. Meanwhile, the above-mentioned curvature radius RC is preferable to be reduced continuously as sown in the present embodiment, but it can be reduced gradually. Moreover, the profile TL reduces a vertical spring of the tire, thereby excelling in ride comfort during normal running.

Figure 6B:
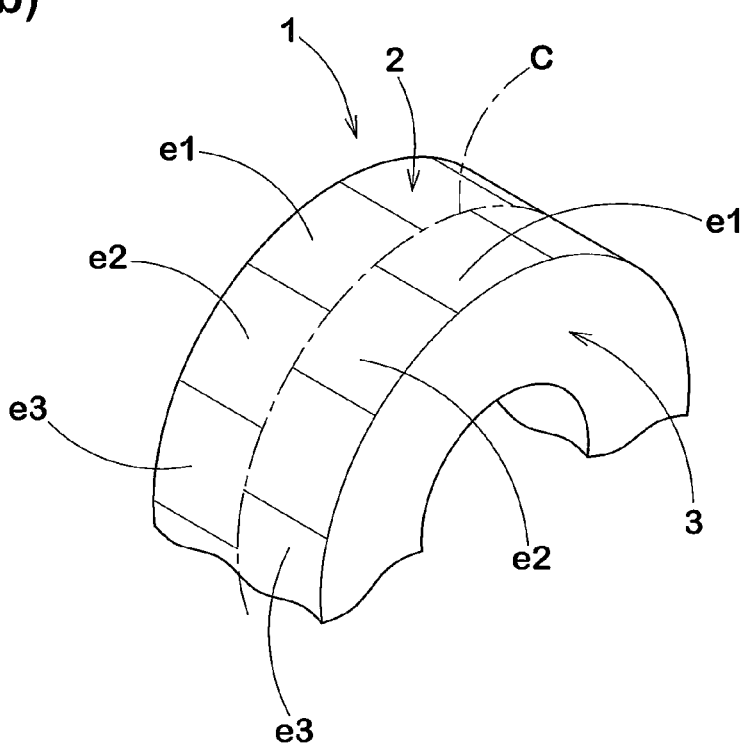

The specific embodiments of the present invention were described hereinbefore, but various changes may be made without departing from the scope of the invention. For example, as shown in FIG. 6(*b*), it may be possible to adopt an asymmetrical pitch array wherein pitches e1, e2, e3 . . . disposed in both sides of the tire equator c are in phase shifting in the circumferential direction as a pitch pattern of the tread portion 2. In this case, the recess 11 arranged in each of the light and left side reinforcing rubber layers 9 can also be arranged left-right asymmetrically (with phase shifting in the circumferential direction). Moreover, in this case, two pitch patterns are considered to be arranged in parallel in the tread portion 2. Therefore, the above-mentioned phase difference δ is calculated in each side of the tire equator c, and it is preferably to set on one side, more preferably set on both sides, in the above range. Although the present invention is particularly suitable for passenger cars, it is not to be considered limited to the embodiments shown in drawings, but it will be obvious that various changes may be made to conduct.

To ascertain the efficacy of the present invention, a plurality type of run-flat tires were prototyped, having a tire size of "245/40zR18" based on a tire structure of Table 1. The tires were tested for their performances. A length L of a side reinforcing rubber in the radial direction of the tire is set to 50 mm, and 10 mm is adopted as the maximum thickness of a base portion. An appearance configuration of a tread pattern is shown in FIG. 5.

shapes of recesses provided in the side reinforcing rubber was set to have the same rectangle each other as shown in FIG. 7, and this was provided in an intermediate position of the side reinforcing rubber length in the radial direction. The specification is as follows. Meanwhile, the recesses in the right and left side reinforcing rubber layers are symmetrically provided with respect to the tire equator.

Length Wg of the recess in the tire circumferential direction: 10 mm;
Length Lg of the recess in the tire radial direction: 45 mm;
Depth d1 of the recess: 7 mm; and
Volume of the recess: 1.6 cm$^3$.

Figure 14A:
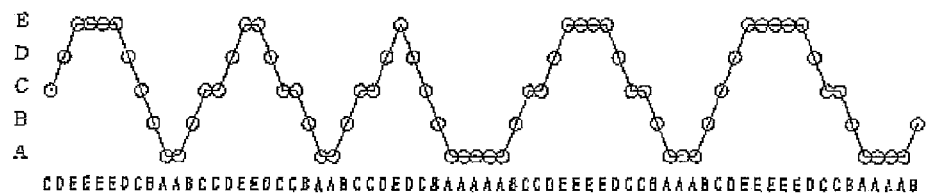
FIG. 14(*a*) to (*c*) showing examples of array of pattern elements.
Figure 14B:
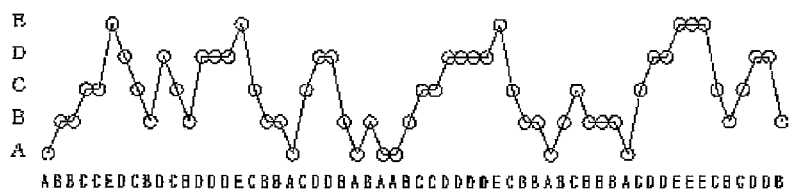
Figure 14C:
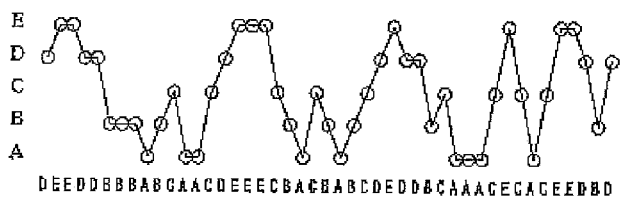
Figure 15A:
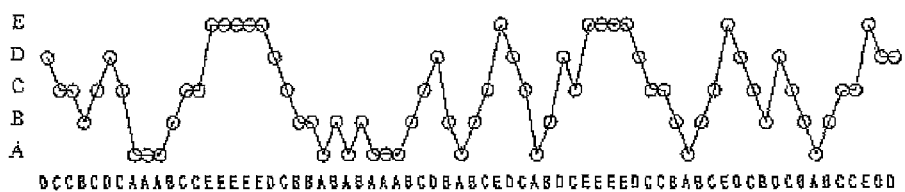
FIG. 15 (*a*) to (*e*) showing examples of the arrays of recesses.
Figure 15B:
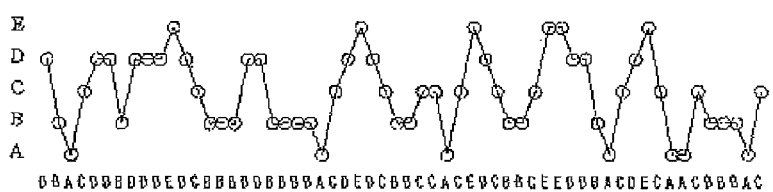
Figure 15C:
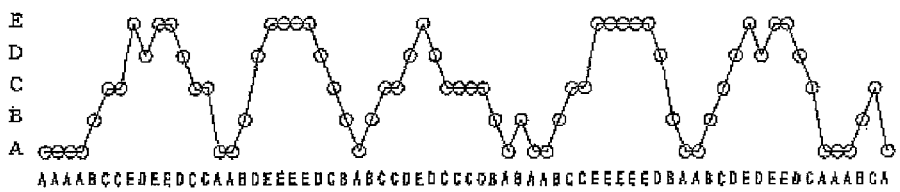
Figure 15D:
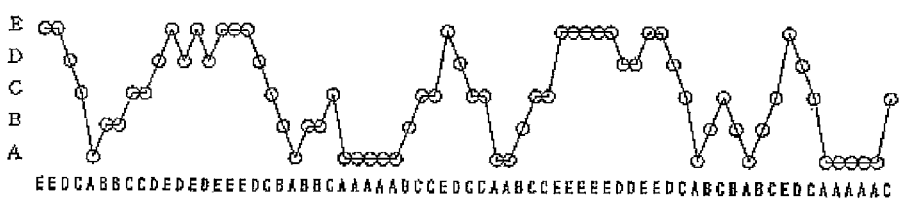
Figure 15E:
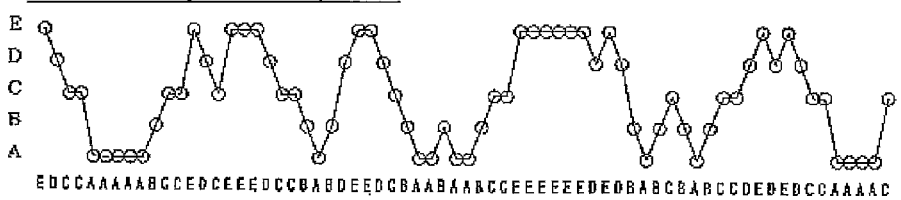
Figure 16A:
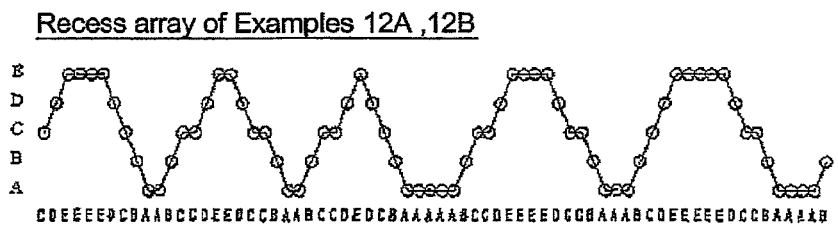
FIG. 16 (*a*) to (*d*) showing examples of the arrays of recesses.
Figure 16B:
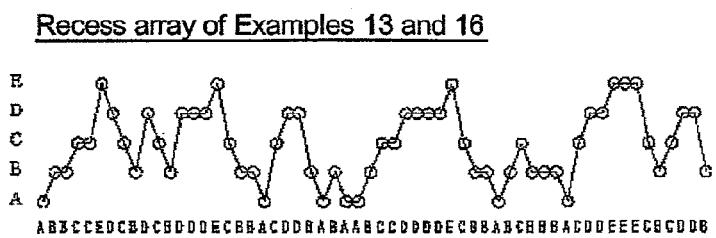
Figure 16C:
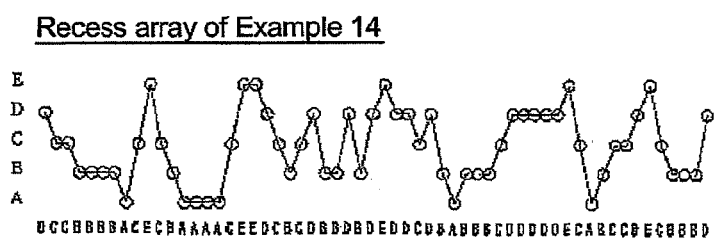
Figure 16D:
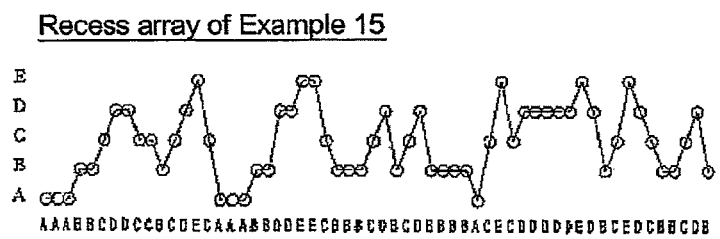

In Examples 7 to 17, circumferential pitches of the recess were set as five kinds of variable pitches A to E, and random arrangements shown in FIGS. 15 and 16 were adopted. Meanwhile, the arrays of recesses of Examples 9 to 17 were calculated by a chaos function. The pattern elements of the tread portion were set as five kinds of variable pitches A to E, and the array shown in FIG. 14 was adopted. Ratios among the pitches A to E are as follows:

A:B:C:D:E=0.750:0.875:1.0:1.125:1.25.

For the test tires, two kinds of tire outer surface profiles PA and PB were adopted, each having the following specifications:

Profile PA:
RY60=0.06
RY75=0.08
RY90=0.19
RY100=0.57
Profile PB:
RY60=0.09
RY75=0.14
RY90=0.37
RY100=0.57

The method of test is as follows.

<Noise Performance>

Each test tire, which internal pressure was 230 kPa, was mounted on all rims 18×8.5 J of a FR vehicle of 4000 cc displacements. A single person aboard ran the vehicle on an asphalt road in a test course and evaluated values of pitch noise in accordance with his feeling. Results are displayed by using scores with the comparative Example 1 being 100, and the larger the numeric values are, the more favorable it is.

<Uniformity>

Radial force variation (RFV) of load fluctuating force in the vertical direction expressing in the tire axis of rotation were measured by using a tire uniformity tester. Measuring conditions were set as follows: rim being 18×8.5 J, number of rotations of the tire being 60 rpm, Internal Pressure being 200 kPa, and vertical Load 4.88 kN. Results were displayed by using indices with the comparative Example 1 being 100, and the larger the numeric values are, the more favorable the uniformity is.

<Run-Flat Resistance>

After mounted on the above-mentioned rims, the each test tire was inflated at inflation pressure 230 kPa and was left for 34 hours at 38 degrees c. And then, a valve core was pulled off from the rim, and the tire cavity became connected with the air. And in this condition, the tire was rolled on a drum tester having a drum with radius of 1.7 m at a speed of 80 km/h and under loaded of 5.0 kN, driving time to breaking point of the tire was measured. Results were displayed by using indices with the Comparative Example 1 being 100, and the larger the numeric values are, the more favorable it is.

<Ride Comfort (Vertical Spring Index)>

The test tire was mounted on the above-mentioned rim, inflated at inflation pressure of 200 kPa, and an inclination of amount of vertical deflection loaded at a vertical load of zero to 4 kN was measured. Results with the Comparative Example 1 being 100, and the larger the numeric values are, the less vertical spring the more favorable the vertical spring index is.

The test results and the like are shown in Table 1.

TABLE 1

|  | Ref. Ex. 1 | Ref. Ex. 2 | Ex. 1A | Ex. 1B | Ex. 2 | Ex. 3 | Ex. 4 | Ex. 5 | Ex. 6 | Ref. Ex. 3 | Ref. Ex. 4 | Ex. 7 |
|---|---|---|---|---|---|---|---|---|---|---|---|---|
| Total number of pattern elements | 68 | 68 | 68 | 68 | 68 | 68 | 68 | 68 | 68 | 68 | 68 | 68 |
| Total number of recesses | 45 | 45 | 50 | 50 | 55 | 60 | 68 | 75 | 80 | 90 | 100 | 68 |
| Ration (n/N) | 0.662 | 0.662 | 0.735 | 0.735 | 0.809 | 0.882 | 1.000 | 1.103 | 1.176 | 1.324 | 1.471 | 1.000 |
| Phase difference of | 0.76π | 0.76π | 0.48π | 0.48π | 0.25π | 0.07π | −0.18π | −0.35π | −0.45π | −0.62π | −0.76π | 0.14π |

TABLE 1-continued

| primary component δ (rad) | | | | | | | | | | | |
|---|---|---|---|---|---|---|---|---|---|---|---|
| Array pitch of recess | Constant | Constant | Constant | Constant | Constant | Constant | Constant | Constant | Constant | Constant | Constant | Random |
| Profile of tire outer surface | PB | PA | PA | PB | PB | PB | PB | PB | PB | PB | PB | PB |
| Noise Performance [Ratings] | 100 | 95 | 105 | 115 | 120 | 130 | 120 | 130 | 120 | 105 | 105 | 135 |
| Uniformity [Index] | 100 | 90 | 100 | 115 | 120 | 125 | 120 | 130 | 125 | 110 | 105 | 135 |
| Run-flat durability [Index] | 100 | 95 | 95 | 100 | 100 | 100 | 100 | 98 | 99 | 95 | 90 | 100 |
| Ride comfort [Index] | 100 | 90 | 91 | 102 | 103 | 104 | 105 | 105 | 109 | 110 | 111 | 105 |

| | Ex. 8 | Ex. 9 | Ex. 10 | Ex. 11 | Ex. 12A | Ex. 12B | Ex. 13 | Ex. 14 | Ex. 15 | Ex. 16 | Ex. 17 |
|---|---|---|---|---|---|---|---|---|---|---|---|
| Total number of pattern elements | 68 | 68 | 68 | 68 | 68 | 68 | 68 | 68 | 68 | 45 | 58 |
| Total number of recesses | 58 | 68 | 68 | 68 | 68 | 68 | 58 | 58 | 58 | 58 | 68 |
| Ration (n/N) | 0.853 | 1 | 1 | 1 | 1 | 1 | 0.853 | 0.853 | 0.853 | 1.289 | 1.172 |
| Phase difference of primary component δ (rad) | 0.1π | 0.07π | −0.14π | 0.10π | 0 | 0 | 0.30π | 0.25π | 0.21π | −0.44π | −0.26π |
| Array pitch of recess | Random | Random | Random | Random | Random | Random | Random | Random | Random | Random | Random |
| Profile of tire outer surface | PB | PB | PB | PB | PA | PB | PB | PB | PB | PB | PB |
| Noise Performance [Ratings] | 125 | 130 | 135 | 130 | 125 | 135 | 130 | 120 | 120 | 105 | 110 |
| Uniformity [Index] | 125 | 130 | 130 | 125 | 125 | 135 | 125 | 120 | 120 | 110 | 115 |
| Run-flat durability [Index] | 100 | 100 | 100 | 100 | 95 | 100 | 100 | 100 | 100 | 100 | 100 |
| Ride comfort [Index] | 103 | 105 | 105 | 105 | 95 | 105 | 103 | 103 | 103 | 102 | 105 |

As the results of the test, it was confirmed that the tires of the Examples were reduced in weight without deteriorating the run-flat durability and it could improve the ride comfort.

The invention claimed is:

1. A run-flat tire comprising a toroidal carcass extending from a tread portion to a bead core of each bead portion through each of sidewall portions, and a pair of side reinforcing rubbers arranged inside said carcass and extending in the tire radial direction inwardly and outwardly along the sidewall portions; wherein
on the outer surface of said tread portion, a pitch pattern is made of pattern elements, which is the minimum unit of repeat pattern, aligned in the circumferential direction of the tire;
each of said side reinforcing rubbers is provided with recesses circumferentially spaced on the inner surface of the side reinforcing rubber facing the tire cavity; and
the total number (n) of recesses on each of the side reinforcing rubbers is 0.70 to 1.30 times the total number of pattern elements, wherein
a phase difference δ between a primary component of the pitch pattern and a primary component of a recess array pattern is not more than π/2 (rad),
the primary component of the pitch pattern is obtained by substituting an unit pulse for each of the pattern elements of said pitch pattern, in which a pulse row is formed in an array sequence of the pattern elements with reference to a single pattern element, and in which the pulses are spaced from each other in the circumferential direction by a pitch of circumferential length of the pattern elements, and by expanding the pulse array to a Fourier series; and
the primary component of the recess array pattern is obtained by substituting an unit pulse for each of the recesses of said recess array, in which a pulse row is formed in an array sequence of the array of the recess with reference to one of recesses of the corresponding positions to said reference point of the pattern element, and in which the pulses are spaced each other in the circumferential direction by a circumferential length of the recess, and by expanding the pulse array to a Fourier series.

2. The run-flat tire as set forth in claim 1, wherein said recesses are substantially in the same configuration, disposed in the same position of the tire in the radial direction, and spaced by a constant pitch in the circumferential direction of the tire.

3. The run-flat tire as set forth in claim 1, wherein said recess comprises at least three kinds of pitches each of that is a length in the circumferential direction of the tire, and the pitches are arranged in a random manner.

4. The run-flat tire as set forth in claim 1, wherein
said recess comprises at least three kinds of pitches each of that is a length in the circumferential direction of the tire, and the pitches are arranged in accordance with a chaotic function.

5. The run-flat tire as set forth in claim 1, wherein
in a profile of the tire outer surface on the tire meridian section including the axis of the tire under a standard unloaded state, which is mounted on a standard wheel rim, at standard inflation, and unloaded,
if a point is identified as the point (P) on an outer surface of the tire separated by a distance of 45% of the tire maximum width (SW) from an intersection point (CP) of the tire outer surface with the tire equator (C), the curvature radius (RC) of the tire outer surface reduces gradually outwardly toward the axial direction in an interval between the above-mentioned intersection point (CP) and the above-mentioned point (P); and the relationships are formulated as follows:

$0.05 < Y60/H \leq 0.1$ $0.1 < Y75/H \leq 0.2$ $0.2 < Y90/H \leq 0.4$ $0.4 < Y100/H \leq 0.7$ wherein each (each of Y60, Y75, Y90, and Y100 is the distance between the said intersection point (CP) and each of points P60, P75, P90, and P100 on the tire outer surface separated in the tire axial direction by a distance of 60%, 75%, 90%, and 100% of half the tire maximum axial width (SW/2) from said intersection point (CP); and the above-mentioned "H" is a cross-sectional height of the tire.

* * * * *